United States Patent [19]

Kane

[11] 4,204,354
[45] May 27, 1980

[54] ARTICULATED FISHING DRUM

[76] Inventor: Michael J. Kane, 3602 Vining, Bellingham, Wash. 98225

[21] Appl. No.: 17,437

[22] Filed: Mar. 5, 1979

[51] Int. Cl.$^2$ .............................................. A01K 73/00
[52] U.S. Cl. ............................................ 43/4.5; 43/8; 254/137
[58] Field of Search ..................... 254/137, 138, 175.5, 254/175.7; 43/4.5, 7, 8, 9, 14; 414/137, 138, 139, 140, 143; 114/255; 242/55, 54 R, 86.5 R, 106

[56] References Cited

U.S. PATENT DOCUMENTS

| | | | |
|---|---|---|---|
| 893,642 | 7/1908 | Morch | 114/255 |
| 1,038,414 | 9/1912 | Monroe | 254/138 |
| 3,052,354 | 9/1962 | Luketa . | |
| 3,112,575 | 12/1963 | Lewis et al. | 43/8 |
| 3,205,845 | 9/1965 | Slingelandt . | |
| 3,478,461 | 11/1969 | Luketa | 43/8 |
| 3,707,799 | 1/1973 | Hatley | 43/8 |
| 3,974,923 | 8/1976 | Mark et al. | 43/8 X |

Primary Examiner—John M. Jillions

[57] ABSTRACT

An articulated fishing drum assembly especially adapted to be operated in a first lower operating position or a second upper operating position. The drum assembly comprises a pair of piston and cylinder actuating means to move a drum member from the lower to the upper operating position. Mounting members are rotatably attached to the drum member at its axis of rotation and to the sidewalls of a fishing vessel and define a pivot arc through which the drum member moves. A guide mechanism is provided for locating a fishing net on the drum member in an evenly spaced distribution when the drum member is in either of the upper or lower operating positions. The guide mechanism is movable between first and second positions such that a line drawn through the axis of rotation of the drum member and the guide mechanism will be substantially horizontal when the drum member is in the upper or lower operating positions.

28 Claims, 5 Drawing Figures

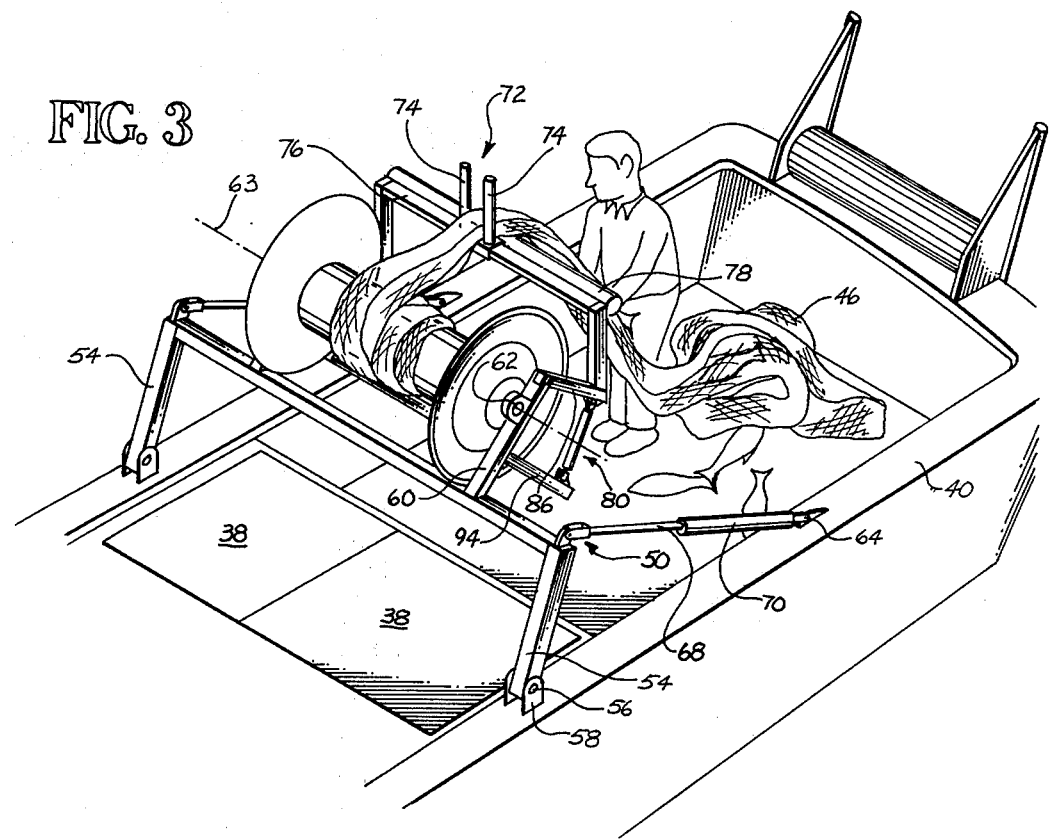
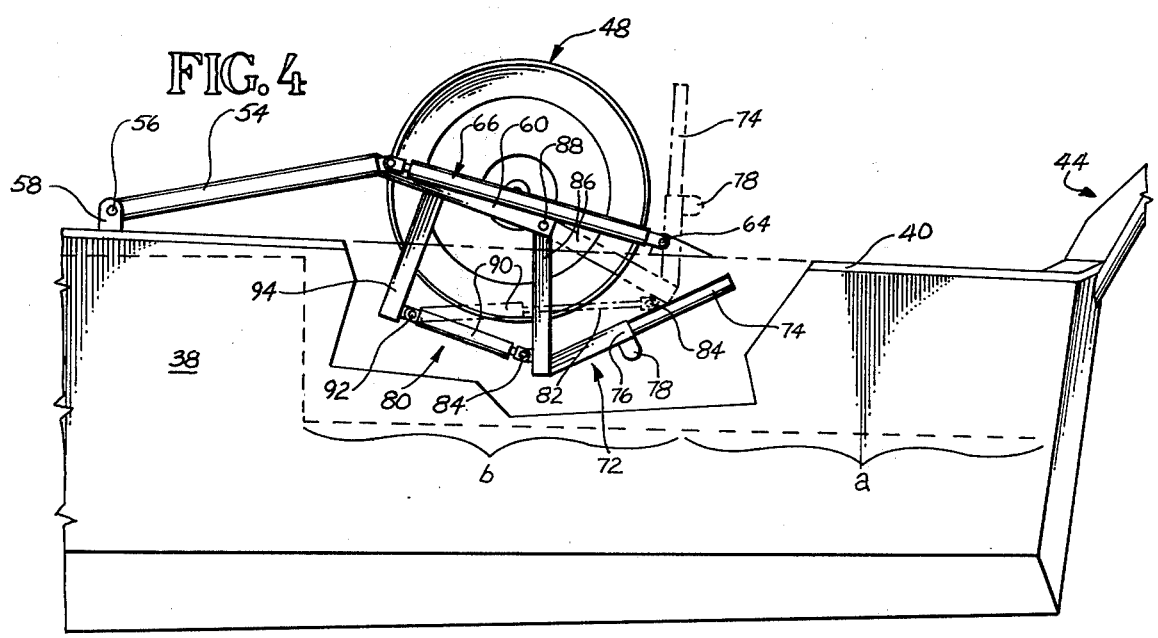

ARTICULATED FISHING DRUM

BACKGROUND OF THE INVENTION

The present invention relates to apparatus used on fishing vessels by which fishing net may be retrieved and stored.

Fishing vessels which are used to catch fish during seasonal fish spawning runs or migrations, such as the annual salmon runs along the Pacific Northwest Coast of the United States, are typically in the 25 to 50 foot range and deploy nets into the water over the stern gunaale. These fishing vessels have a rear cockpit area defined by side walls and a stern end wall with the stern portion being fitted with a power reel member. The fishing net is wound upon a drum member which is fixedly mounted in a forward portion of the cockpit area. Upon deploying the nets, the net is wound from the drum member and through the power reel member into the body of water. Upon retrieving the fishing net, it may be affixed to the drum member and if the fishermen have experienced a light catch, the net may be wound directly upon the drum as it is moved from the water, with the fish being removed therefrom before the net is wound upon the drum.

However, if an extremely heavy catch has been made, two problems present themselves with the prior art system. Firstly, with the drum member securely affixed to the cockpit floor, a substantial portion of the area available for holding fish and fishing net is consumed by the drum member and its framework, with the result being that the fishing net and fish contained therein are retrieved onto the fishing vessel and deposited around and over the drum member. In this manner, the fish may not be removed from the fishing net and the net may not be wound upon the drum member until the vessel returns to shore. Secondly, because the drum member is unavailable for use during these heavy catch periods, the fishing net must be retrieved by hand into the cockpit area (with the assistance of the power reel member), significantly adding to the physical work load of the crew members.

If the fishermen are aware that a heavy catch will be experienced, they may remove the drum member from the cockpit area while at the dock, and proceed to remove the net from the water by hand into the fishing vessel. Therefore, in either case, when a large catch is experienced the drum member is not available for use in retrieving the fishing net, and the net may not be wound thereon for a period of time after the vessel reaches shore.

On certain of the extremely high yield seasonal fishing seasons there are very definite fishing boundaries established by local or federal regulatory agencies, which delineate those areas in which nets may be laid and those areas which must remain free of nets. If a fishing net or fishing vessel is observed within any of these prohibited areas, any protected fish found on the vessel or in the nets may be confiscated, and the owner may be liable for substantial fines or other penalties. After laying the nets in an area which is subject to daily tidal action, a fisherman equipped with a conventional fishing drum may have extreme difficulty in retrieving a fully loaded fishing net before it passes into the prohibited area. As tidal movement rapidly brings the net toward a boundary line, and with the drum member securely mounted in the cockpit of a fishing vessel, there is no time to return to shore to remove the drum, and since the net must be retrieved by hand, there is a possibility that the net may have to be cut away from a fishing vessel since the crew members are unable to retrieve it quickly enough.

SUMMARY OF THE INVENTION

In the present invention, there is provided a method of reeling a fishing net onto a fishing vessel. The fishing vessel is provided with a rear cockpit fish-receiving area defined by side walls and a rear end wall. The rear end wall is equipped with a power reel member to aid in the retrieval of fishing nets. A drum member is provided onto which the fishing net may be reeled for storage. The drum member may be located at a first lower operating position at the level of a side wall of said vessel or at a second upper operating position above the first lower operating position. The drum member is adapted for rotation about an axis generally aligned along the transverse axis of the fishing vessel, and has hydraulic power means to effect rotation of the drum member about the axis of rotation.

The drum member is operated in the first lower operating position during periods of low yield fish catches such that the net is removed from its deployed position and reeled directly onto the drum member, with the fish contained in the net being removed before the net is reeled onto the drum member. The drum member is moved to its second upper operating position during periods of high yield catches such that the net is removed from its deployed position and placed in a cockpit portion of the fishing vessel, and is thereafter reeled onto the drum member in its second upper operating position.

Actuating means are provided to move the drum member from its first lower operating position to its second upper operating position. The drum member is moved from the first operating position to the second operating position in a pivot arc defined by mounting members rotatably attached at a first end of the drum member and at a second end to the side walls of the vessel. A guide mechanism is provided for locating the fishing net upon the drum member in an evenly spaced distribution, the guide member having a first upper operating position when said drum member is in its first lower operating position, and a second lower operating position when said drum member is in its second upper operating position. A line drawn through the axis of rotation of the drum member and the guide mechanism will be substantially horizontal when the drum member is in either the first lower operating position or the second upper operating position.

In the first lower operating position, the drum member is located in a forward position of the cockpit area at approximately the level of the side walls, with the rearward portion of the cockpit area being available to receive a partially loaded fishing net. In its second upper operating position, the drum member is raised substantially above the forward portion of the cockpit area, thereby providing both the forward and rearward cockpit portions to receive a fully loaded fishing net.

An apparatus to practice the method of the present invention comprises a drum member and mounting members which are rotatably attached at a first end to the drum member at a transverse axis of rotation, and pivotally connected at a second end to the fishing vessel. There are actuating means in the form of a hydraulic jack comprising a piston and a cylinder, one of which is pivotally mounted to a mounting member and the other of which is pivotally mounted to the fishing vessel. Further, there is a guide mechanism pivotally connected to the mounting member at a second pivot connection permitting the guide mechanism to be pivotally moved from a first upper operating position when the drum member is in its lower operating position to a second lower operating position when the drum member is in its upper operating position. Actuating means to pivotally move the guide mechanism from the first operating position to the second operating position are in the form of a hydraulic jack comprising a piston and cylinder.

Other features of the invention will become apparent from the following detailed description.

BRIEF DESCRIPTION OF THE DRAWINGS

FIG. 3 is a partial isometric view of the stern cockpit portion of a fishing vessel illustrating the present invention in a second upper operating position;

FIG. 4 is a side perspective view of the present invention in a first lower operating position.

DESCRIPTION OF THE PREFERRED EMBODIMENT

Figure 1:
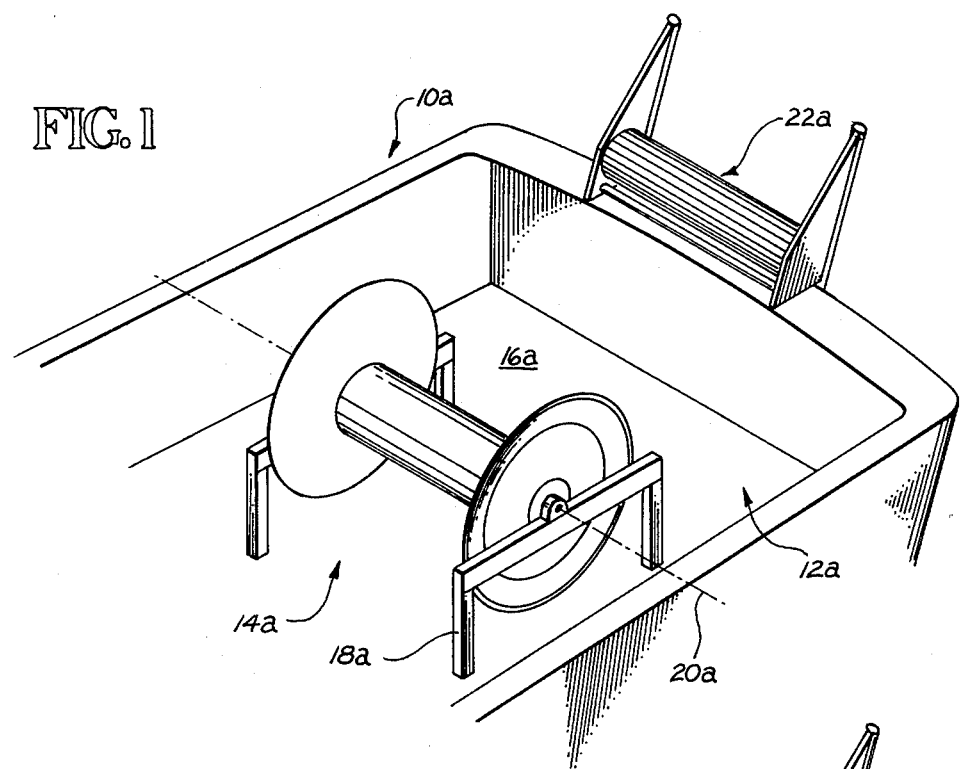
FIG. 1 is a partial isometric view illustrating the stern cockpit portion of a fishing vessel having a drum member known in the prior art.

As shown in FIG. 1, there is a fishing vessel generally designated 10a having a rear cockpit area 12a and a drum member 14a fixedly attached thereto as is available in the prior art. The drum member 14a is fixedly attached to the floor 16a of the rear cockpit area 12a by stationary frame 18a and rotates about a single transverse axis 20a. When a fishing net (not shown in FIG. 1) is retrieved from a deployed position in a body of water onto the fishing vessel 10a, it is directed into the fishing vessel through the power reel member 22a, and either wound upon the drum member 14a or deposited within the cockpit area 12a. Once away from the dock, and while engaged in a fishing maneuver, the drum member 14a may not be moved from its stationary position.

Figure 2:
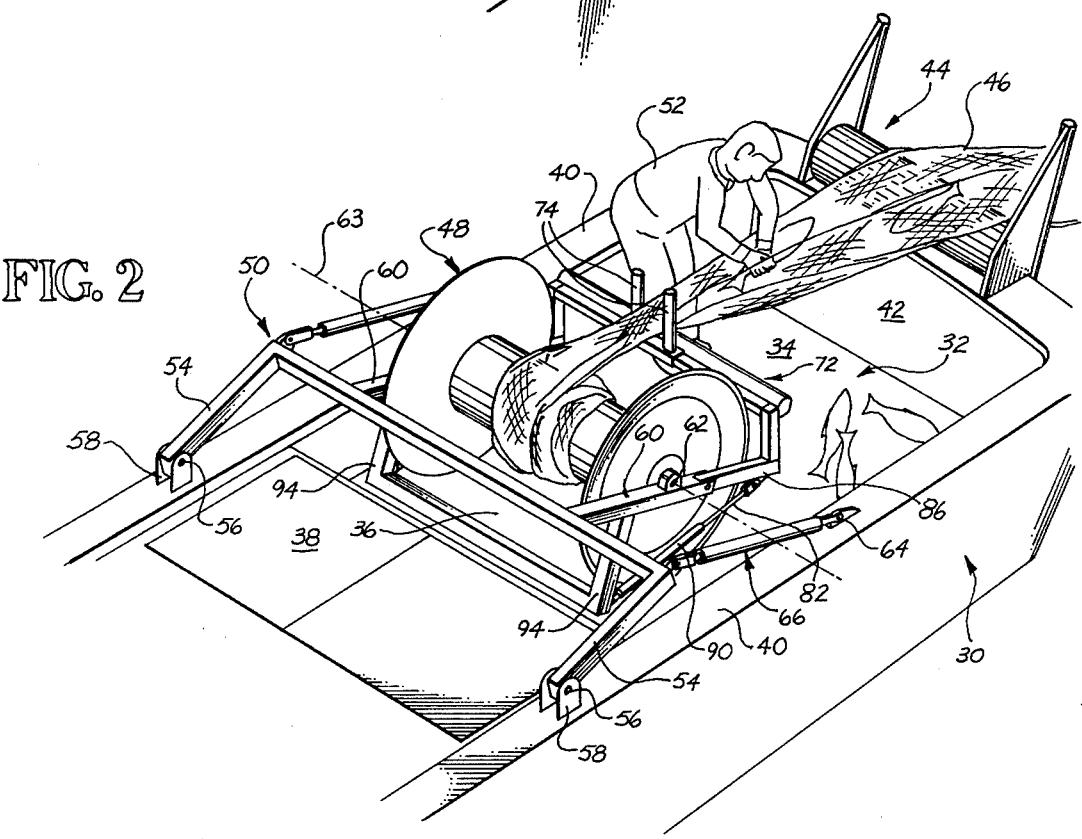
FIG. 2 is a partial isometric view of the stern cockpit portion of a fishing vessel illustrating the present invention in a first lower operating position.

FIG. 2 illustrates the present invention installed upon a fishing vessel similar in construction to that known in the prior art. The fishing vessel 30 is provided with a rear cockpit area 32 having a lower floor portion divided into a rearward portion 34 (denoted by the letter "a" in FIG. 4) and a forward portion 36 (denoted by the letter "b" in FIG. 4). There are one or more fish holding tanks 38 forward of the cockpit area 32, which may be recessed below the floor portion or, as seen more clearly in FIG. 4, may be raised thereabove. The rear cockpit area 32 is defined by side walls 40 and an end wall 42. The end wall 42 is provided with a power reel member 44 which assists in the retrieval of a fishing net 46 by rotating about a transverse axis and frictionally engaging the net 46, thereby pulling the net 46 into the cockpit area 32.

Rather than the stationary drum member 14a known in the prior art, the present invention comprises a drum member 48 having an articulated mounting apparatus, generally designated 50 which enables the fisherman 52 to move the drum member 48 out of its customary position shown in FIG. 2. The articulated mounting apparatus 50 comprises a U-shaped mounting member 54 being pivotally mounted at 56 to bracket members 58 which are in turn mounted to the side walls 40 of the fishing vessel. The mounting member 54 is provided with a pair of rearwardly extending members 60 upon which the drum member 48 is rotatably mounted at 62 about a transverse axis of rotation 63.

Figure 5:
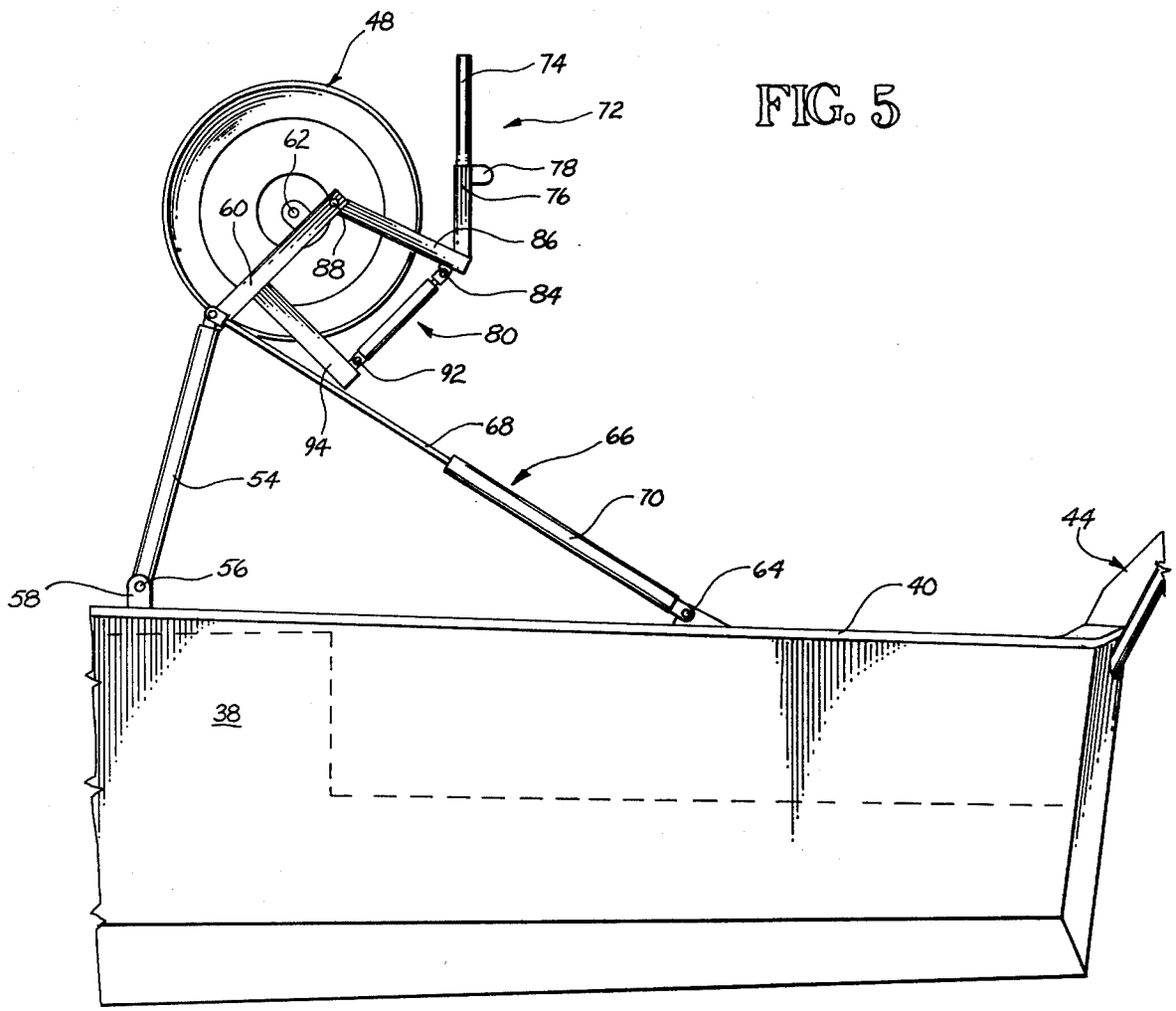
FIG. 5 is a side perspective view of the present invention in a second upper operating position.

Pivotally mounted at 64 to the side wall 40 is an actuating means 66 comprising a cooperating piston 68 and cylinder 70 (seen more clearly in FIGS. 3 and 5). The actuating means 66 may be hydraulically controlled, and upon extention of the piston 68, the drum member will move in an upward and forward arc defined by the mounting member 54, as it pivots about its pivot point 56.

There is a level wind mechanism, generally designated 72, which comprises a pair of upright guide members 74 separated from one another sufficiently to admit passage of a fishing net therebetween. The guide members 74 are slideably mounted to a transverse guide bar 76, and there is provided a smooth roller surface 78 rearward of the guide bar 76 and the guide members 74. When the drum member 48 is rotated about its transverse axis of rotation 63, the guide members 74 are synchronized to be moved hydraulically from one end of the transverse guide bar 76 to the other end, such that a fishing net 46 affixed to the drum member 48 is evenly distributed upon the drum member 48 by the guide members 74, as they move transversely across the transverse guide bar 76. The level wind mechanism 72 is provided with an actuating device 80 which enables the level wind mechanism 72 to be moved from a first upper position (as shown in FIG. 2, and in FIG. 4 in broken lines) when the drum member 48 is in its first lower operating position of FIGS. 2 and 4, to a second lower position (as shown in FIG. 3 and in FIG. 4 in solid lines) when the drum member 48 is in its second upper operating position. The actuating means 80 comprises a piston 82 pivotally mounted at 84 to a rearward end of a brace member 86, which is in turn pivotally mounted at its forward end at 88 to a rearward end of said extension member 60. The piston 82 cooperates with a cylinder 90 which is pivotally mounted at 92 to an arm member 94 which is formed as a generally U-shaped member attached to the member 60.

As shown in FIGS. 2 and 4, when the drum member 48 is to be operated in its first lower operating position in order to retrieve a partially loaded fishing net 46, the level wind mechanism 72 is moved to its first "upper" operating position by extending the piston 82 from the cylinder 90, thereby moving the brace member 86 rearwaredly and upwardly about its pivot point 88, and bringing the roller surface 78 and guide members 74 to a position between the axis of rotation 63 of said drum member 48 and the power reel member 44, such that a line drawn between the axis of rotation of the drum member 48 and the roller surface 78 will be generally horizontal.

As illustrated in FIGS. 3 and 5, when the drum member 48 is moved to its second upper operating position by actuating the actuating means 66 the level wind mechanism 72 is moved to its second "lower" operating position by retracting the actuating means 80 and thereby moving the brace member 86 downwardly and forwardly about its pivot point 88. In so doing, the roller surface 78 and guide members 74 are brought to a position generally level with a line drawn hozizontally through the axis of rotation 63 of the drum member 48.

During those times when the drum member 48 is not in use, it may be elevated to its second upper position shown in FIG. 5, thereby providing increased cockpit space and easy movement of crew members or materials throughout the cockpit. Alternatively, the drum member may be left in its lower operating position of FIG. 4, with the level wind mechanism moved to its second "lower" position beneath the drum member and therefore out of the way.

The significance of the present invention may be best seen in the simulated fishing environment of FIGS. 2 and 3. After distributing the fishing net 46, and upon retrieving the fishing net into the vessel, if the fishermen have succeeded only in catching a relatively low yield of fish, the drum member 48 is positioned in its first lower operating position, with the level wind mechanism 72 in its first upper operating position, the net 46 being wound directly onto the drum member 48. As the net is retrieved from the water, a fisherman may pick fish 96 directly from the net as it enters the cockpit area and drop them onto the rearward floor portion 34 (or "a" in FIG. 4), for later distribution into the holding tanks 38. After the net 46 has been fully retrieved onto the drum member 48, the drum may be elevated to its second upper operating position so as to permit the crewmen to move the fish from the rearward floor portion 34 to the holding tanks 38. However, if upon retrieving the net 46, the fishermen encounter an extremely heavy catch (or if they know beforehand that it will be a heavy catch), the drum member 48 may be raised to its second upper operating position and the net may be retrieved and deposited into the cockpit portion 32 of the fishing vessel by using the power reel member 44. After the net 46 has been fully retrieved, it may then be directed through the guide members 74 and affixed to the drum member 48, and as the net is reeled upwardly onto the drum member, the fish may be picked therefrom. In this manner the entire receiving surface of the cockpit area 32 is available to receive the fishing net and fish contained therein.

Because the prior art drum member 14a is bolted directly to the cockpit floor 16a, it may not be moved or removed after the fishing net has been retrieved partially or fully into the fishing vessel. It therefore poses a significant obstacle to efficient movement of crewmen, nets or fish, as well as taking up valuable space which may be needed if an extremely large catch is experienced. Additionally, during such a situation, the drum member 14a would not be available to assist in retrieval of the fishing net, since due to the limited space, the net would very often partially cover the drum member, and therefore the crewmen must retrieve the net by hand, with the aid of the power reel 22a. The present invention permits the drum member to be utilized in retrieving the fishing net even during periods of high yield catches, assuming that sufficient crewmen are available to pick fish from the nets as it is retrieved, and further assuming that there is sufficient time to permit this type of retrieval. (While retrieval of a fully loaded fishing net with the drum member in the second upper operating position may place undesirable stresses on the mounting members 54 or the actuating means 66, there may be times when such an operation is necessary under the conditions, an option which does not exist with prior art apparatus.)

An additional feature of the present invention which is unavailable on prior art apparatus is that, by moving the drum member to the second upper operating position, it is raised above the cockpit area and during storms or heavy seas causes less obstruction and chance for injury to crewmen. It is not uncommon for seamen to be flung against the prior art drum members since they are fixedly attached to the center of the cockpit floor leading to potentially serious injury.

It is to be understood that the motive force for the actuation of the articulated fishing drum member and of the level wind device described above, is of conventional design and construction, whose application to the present invention would be within the competence of one skilled in the art of hydraulics.

Having thus described the invention, it should be understood that numerous structural modifications and adaptations may be resorted to without departing from the spirit of the invention.

What is claimed is:

1. A method of reeling in a fishing net onto a fishing vessel from a deployed position in a body of water, said method being particularly adapted to permit the reeling in of said fishing net during conditions of low yield catches or high yield catches with a minimum of time and physical effort, said method comprising the steps of:
    a. providing a fishing vessel having longitudinal and transverse axes and having a cockpit area defined by a floor portion, side walls and an end wall of said vessel, said end wall being provided with a rotating power roll member aligned along the transverse axis of said vessel, said cockpit area having a forward portion and a stern portion;
    b. providing a drum member having a first lower operating position at a level of said side walls of said vessel, and a second upper operating position raised above said first lower operating position providing passage thereunder for crewmen on said fishing vessel, said drum member having an axis of rotation generally aligned along said transverse axis of said vessel, said drum member having hydraulic power means to effect rotation of said drum member about said axis of rotation;
    c. operating said drum member in said first lower operating position during periods of low yield catches such that said net is removed from its deployed position and reeled directly onto said drum member, with the aid of said power roll member affixed to said end walls, said fish contained therein being removed as said net is reeled onto said drum member; and
    d. moving said drum member to its second upper operating position during periods of high yield catches, such that said net is removed from its deployed position and placed in said stern cockpit area of said vessel with the aid of said power roll member, and the net is thereafter reeled onto said drum member in its second upper operating position and the fish are removed therefrom as said net is reeled onto said drum member, whereby, when said drum member is moved to its second upper operative position, said stern cockpit area of said vessel is appreciably enlarged, so that during periods of large fish catches said drum member may be removed out of said cockpit area to its second upper operative position to enable said net with fish therein to be adequately contained in said stern cockpit area.

2. The method as recited in claim 1, further providing moving said drum member from said first lower operating position to said second upper operating position, by actuating means mounted to the side walls of said vessel and to said drum member.

3. The method as recited in claim 1, further providing moving said drum member in a pivot arc between said first lower operating position and said second upper operating position, said pivot arc being defined by mounting members rotatably attached at a first end to said drum member at the location of said transverse axis of rotation, and pivotally attached at a second end to the side walls of said vessel, such that said pivot connection at said second end of the mounting members defines a center point of said pivot arc.

4. The method as recited in claim 1, further providing locating said fishing net upon said drum member in an evenly-spaced distribution by means of a guide mechanism movably affixed to said actuating means.

5. The method as recited in claim 4, further providing moving said guide mechanism between a first upper operating position and a second lower operating position by operating actuating means rotatably attached to said guide mechanism.

6. The method as recited in claim 5, further providing operating said guide mechanism in said first upper operating position when said drum member is in its first lower operative position, and operating said guide mechanism in its second lower operating position when said drum member is in its second upper operating position, such that a line drawn through the axis of rotation of said drum member and said guide mechanism will be substantially horizontal with respect to said body of water when said drum member is in either said first lower operating position or said second upper operating position.

7. The method as recited in claim 1, further providing locating said drum member in said first lower operating position in a forward position of said cockpit area at the level of said side walls, with a rearward portion of said cockpit area being available to receive a partially loaded fishing net.

8. The method as recited in claim 1, further providing locating said drum member in said second upper operating position raised substantially above the forward portion of said cockpit area, thereby providing both of said forward and said rearward cockpit portions to receive a fully loaded fishing net.

9. A method of reeling in a fishing net onto a fishing vessel from a deployed position in a body of water, said method being particularly adapted to permit the reeling in of said fishing net during conditions of low yield catches or high yield catches with a minimum of time and physical effort, said method comprising the steps of:

a. providing a fishing vessel having longitudinal and transverse axes and having a cockpit area defined by a floor portion, side walls and an end wall of said vessel, said end wall being provided with a rotating power roll member aligned along the transverse axis of said vessel, said cockpit area having a forward portion and a stern portion;

b. providing a drum member having a first lower operating position at the level of said side walls of said vessel, and a second upper operating position raised above said first lower operating position providing passage thereunder for crewmen on said fishing vessel, said drum member having an axis of rotation aligned along said transverse axis of said vessel, said drum member having hydraulic power means to effect rotation of said reel about said axis of rotation;

c. providing for movement of said drum member from said first lower operative position to said second upper operative position, by first actuating means mounted to the side walls of said vessel and to said drum member;

d. providing for location of said fishing net upon said drum member in an evenly-spaced distribution by means of a guide mechanism movably affixed to said actuating means, moving said guide mechanism between a first upper operating position and a second lower operating position by operating second actuating means rotatably attached to said guide mechanism;

e. operating said guide mechanism in said first upper operating position when said drum member is in its first lower operating position, and operating said guide mechanism in its second lower operating position when said drum member is in its second upper operating position, such that a line drawn through the axis of rotation of said drum member and said guide mechanism will be substantially horizontal with respect to said body of water when said drum member is in either said first lower operating position or said second upper operating position, f. operating said drum member in said first lower operating position during periods of low yield catches such that said net is removed from its deployed position and reeled directly onto said drum member, with the aid of said power roll member affixed to said end wall, said fish contained therein being removed as said net is reeled onto said reel; and g. moving said drum member to its second upper operative position during periods of high yield catches, such that said net is removed from its deployed position and placed in said stern cockpit area of said vessel with the aid of said power roll member, and the net is thereafter reeled onto said drum member in its second upper operative position and the fish are removed therefrom as said net is reeled onto said drum member, whereby, when said drum member is moved to its second upper operative position, said stern cockpit area of said vessel is appreciably enlarged, so that during periods of large fish catches said drum member may be removed out of said cockpit area to its second upper operative position to enable said net with fish therein to be adequately contained in said stern cockpit area.

10. An apparatus for retrieval of a fishing net under conditions of high yield fish catches or low yield fish catches, said apparatus being adapted for attachment onto a fishing vessel having longitudinal and transverse axes, said fishing vessel having an enlarged cockpit area defined by raised side walls and a rear end wall, said cockpit area having a lower receiving surface for receiving a quantity of fish and fishing net, and having a forward portion and a rearward portion, said rearward cockpit portion being adapted to receive fish and fishing net in periods of low yield catches and said cockpit portion being adapted to receive fish and fishing net during periods of high yield fish catches, said rear end wall being provided with a rotating power roll member to aid in the retrieval of said fishing net into said cockpit, said apparatus comprising:

a. a drum member being adapted for having wound thereon a quantity of fishing net, said drum member having a first lower operating position at a level of said side walls of said vessel, said drum in said first lower operating position being positioned substantially in said forward cockpit portion adjacent said receiving surface when retrieving a partially loaded fishing net, and a second upper operating position raised above said first lower operating position, said drum in said second upper operating position being positioned above said forward cockpit portion such that a fully loaded fishing net may be positioned on said forward portion of said receiving surface, said drum member being mounted for rotation about a generally transversely aligned axis of rotation, b. actuating means mounted to said vessel and to said drum member and adapted to move said drum member from said first lower operating position to said second upper operating position, and c. guide means adapted to space said fishing net evenly upon said drum member when said net is retrieved upon said fishing vessel, and d. means to rotatably drive said drum member about said transverse axis of rotation when in said first lower operating position or said second upper operating portion, whereby, upon actuation of said actuating means said drum member is moved from a first lower operating position to a second upper operating position, such that said drum member may be utilized to retrieve and place a partially loaded fishing net in said rearward cockpit portion while in said first operating position or said drum member may be utilized to retrieve and place a fully loaded fishing net in said forward and rearward cockpit portion while in said second operating position, and said drum does not interfere with the retrieval of said fishing net into said forward cockpit portion when in the second upper operating position.

11. The apparatus as recited in claim 10, wherein said drum member further comprises mounting members mounted on each end of said drum member, said mounting members each being rotatably attached at a related first end to said drum member at a location of said transverse axis of rotation, and said mounting members each being pivotally connected at a second end to said vessel at a cockpit side wall.

12. The apparatus as recited in claim 11, wherein the second ends of said mounting members define with said mounting members an arcuate path of said drum member when said drum member is moved between said first lower operating position and said second upper operating position.

13. The apparatus as recited in claim 10, wherein said actuating means comprises a hydraulic jack comprising a piston and a cylinder, one of said piston and cylinder being pivotally mounted to one of said mounting members, and the other of said piston and cylinder being pivotally mounted to said vessel.

14. The apparatus as recited in claim 10, wherein said guide mechanism comprises a transversely aligned guide member and a pair of movable guide rollers adapted for transverse movement along said transversely aligned guide member.

15. The apparatus as recited in claim 14, wherein said transversely aligned guide member is pivotally connected to said mounting member at a second pivot connection, said second pivot connection permitting said guide mechanism to be pivotally moved from a first upper operating position to a second lower operating position.

16. The apparatus as recited in claim 15, wherein said guide member is adapted to move from its first upper operating position when said drum member is in its lower operating position to its second lower operating position when said drum member is moved to its upper operating position, such that a line drawn between the axis of rotation of said drum member and said guide mechanism is substantially horizontal.

17. The apparatus as recited in claim 10, wherein said guide mechanism further comprises an actuating means adapted to pivotally move said guide mechanism from said first upper operating position to said second lower operating position, said actuating means comprising a hydraulic jack comprising a piston and cylinder.

18. An apparatus for retrieval of a fishing net under conditions of high yield fish catches or low yield fish catches, said apparatus being adapted for attachment onto a fishing vessel having longitudinal and transverse axes and having an enlarged cockpit area defined by side walls and a rear end wall of said vessel, said cockpit having a lower receiving surface for receiving a large quantity of fish and fishing net, said apparatus comprising:

a. a drum member being adapted for having wound thereon a quantity of fishing net, said drum member having a first lower operating position at an approximate level of the side walls of said vessel, and a second upper operating position raised above said first lower operating position, said drum member being mounted for rotation about a transversely aligned axis of rotation;

b. actuating means mounted to said vessel and to said drum member and adapted to move said drum member from said first lower operating position to said second upper operating position, and c. means to rotatably drive said drum member about said transverse axis of rotation when in said first or second operating position, whereby, upon actuation of said actuating means said drum member is moved from a first lower operating position to a second upper operating position, such that said drum member may be utilized to retrieve a partially loaded net in said first operating position or a fully loaded net in said second operating position, and said drum does not interfere with the retrieval of said fishing net into the cockpit area of said vessel when in the second upper operating position.

19. The apparatus as recited in claim 18, wherein said drum member further comprises mounting members mounted on each end of said drum member, said mounting members each being rotatably attached at a related first end to said drum member at a location of said transverse axis of rotation, and said mounting members each being pivotally connected at a second end to said vessel at a cockpit side wall.

20. The apparatus as recited in claim 19, wherein the second ends of said mounting members define with said mounting members an arcuate path of said drum member when said drum member is moved between said first lower operating position and said second upper operating position.

21. The apparatus as recited in claim 18, wherein said actuating means comprises a hydraulic jack comprising a piston and a cylinder, one of said piston and cylinder being pivotally mounted to one of said mounting members, and the other of said piston and cylinder being pivotally mounted to said vessel.

22. The apparatus as recited in claim 18, wherein said apparatus further comprises a guide mechanism adapted to space said fishing net evenly upon said drum member when said net is retrieved onto said vessel.

23. The apparatus as recited in claim 22, wherein said guide mechanism comprises a transversely aligned guide member and a pair of movable guide rollers adapted for transverse movement along said transversely aligned guide member.

24. The apparatus as recited in claim 23, wherein said transversely aligned guide member is pivotally connected to said mounting member at a second pivot connection, said second pivot connection permitting said guide mechanism to be pivotally moved from a first upper operating position to a second lower operating position.

25. The apparatus as recited in claim 24, wherein said guide member is adapted to move from its first upper operating position when said drum member is in its lower operating position to its second lower operating position when said drum member is moved to its upper operating position, such that a line drawn between the axis of rotation of said drum member and said guide mechanism is substantially horizontal.

26. The apparatus as recited in claim 22, wherein said guide mechanism further comprises an actuating means adapted to pivotally move said guide mechanism from said first upper operating position to said second lower operating position, said actuating means comprising a hydraulic jack comprising a piston and cylinder.

27. The apparatus as recited in claim 18, wherein said drum member in said first lower operating position is positioned in a forward portion of said cockpit area at the level of said sidewalls with a stern portion of said cockpit area being available to receive a partially loaded fishing net, such that said fishing net may be positioned upon said drum member as it is retrieved into said fishing vessel.

28. The apparatus as recited in claim 27, wherein said drum member in said second upper operating position is adapted to be positioned substantially above a forward portion of said cockpit area, such that a fully loaded fishing net may be retrieved into both the forward and stern portions of said cockpit area, and thereafter reeled onto said drum member in its second upper operating position.

* * * * *